(12) United States Patent
Aggarwal et al.

(10) Patent No.: US 11,019,489 B2
(45) Date of Patent: May 25, 2021

(54) AUTOMATICALLY CONNECTING TO A SECURED NETWORK

(71) Applicant: Bose Corporation, Framingham, MA (US)

(72) Inventors: Pankaj Aggarwal, Waltham, MA (US); Kapil Hali, Westborough, MA (US); Sheshadri Mantha, Natick, MA (US); Scott Stinson, Upton, MA (US)

(73) Assignee: Bose Corporation, Framingham, MA (US)

( * ) Notice: Subject to any disclaimer, the term of this patent is extended or adjusted under 35 U.S.C. 154(b) by 379 days.

(21) Appl. No.: 15/935,843

(22) Filed: Mar. 26, 2018

(65) Prior Publication Data

US 2019/0297495 A1 Sep. 26, 2019

(51) Int. Cl.
| | |
|---|---|
| *H04L 29/06* | (2006.01) |
| *H04W 12/06* | (2021.01) |
| *H04L 9/32* | (2006.01) |
| *H04L 9/30* | (2006.01) |
| *H04L 9/08* | (2006.01) |
| *H04W 12/08* | (2021.01) |

(52) U.S. Cl.
CPC ............ *H04W 12/06* (2013.01); *H04L 9/083* (2013.01); *H04L 9/30* (2013.01); *H04L 9/3247* (2013.01); *H04L 9/3263* (2013.01); *H04L 63/0442* (2013.01); *H04L 63/083* (2013.01); *H04W 12/08* (2013.01); *H04L 63/08* (2013.01); *H04L 2209/80* (2013.01)

(58) Field of Classification Search
CPC ...... H04W 12/06; H04W 12/08; H04L 9/083; H04L 9/30; H04L 63/083; H04L 9/3263; H04L 63/0442; H04L 9/3247; H04L 63/08; H04L 2209/80
See application file for complete search history.

(56) References Cited

U.S. PATENT DOCUMENTS

| | | | | | |
|---|---|---|---|---|---|
| 5,164,988 | A | * | 11/1992 | Matyas | ............. G06F 21/79 380/279 |
| 5,727,066 | A | * | 3/1998 | Elliott | ............... H03G 5/005 381/1 |

(Continued)

FOREIGN PATENT DOCUMENTS

| | | |
|---|---|---|
| EP | 3 282 638 | 2/2018 |
| WO | WO-2004068730 A1 * | 8/2004 ............... H04R 5/02 |

OTHER PUBLICATIONS

International Search Report and Written Opinion; PCT/US2019/021149; dated May 10, 2019; 16 pages.

*Primary Examiner* — John B King
(74) *Attorney, Agent, or Firm* — Fish & Richardson P.C.

(57) ABSTRACT

Technology described in this document can be embodied in a method for facilitating automatic connection to a network. The method includes receiving, at a first device that is authenticated to the network, an identifier of a second device, and retrieving, by the first device based on the identifier, a public key for the second device. The data encrypted using the public key is decryptable using a private key of the second device. The method also includes encrypting, using the public key for the second device, credential information usable by the second device for authenticating to the network, and transmitting, to the second device, the encrypted credential information.

32 Claims, 7 Drawing Sheets

(56) References Cited

U.S. PATENT DOCUMENTS

| | | | |
|---|---|---|---|
| 6,826,690 B1* | 11/2004 | Hind | G06F 21/31 |
| | | | 713/173 |
| 9,220,012 B1 | 12/2015 | Inamdar | |
| 10,111,002 B1* | 10/2018 | Poulad | H04H 60/04 |
| 2002/0013772 A1* | 1/2002 | Peinado | H04L 63/068 |
| | | | 705/51 |
| 2014/0258724 A1 | 9/2014 | Lambert et al. | |
| 2016/0065719 A1* | 3/2016 | Jeong | H04M 1/7253 |
| | | | 455/420 |
| 2016/0072806 A1* | 3/2016 | Kim | H04W 12/04 |
| | | | 726/5 |
| 2016/0100310 A1* | 4/2016 | Lee | H04W 12/06 |
| | | | 713/171 |
| 2017/0019873 A1* | 1/2017 | Britt | H04W 12/0609 |
| 2017/0134943 A1* | 5/2017 | Min | H04L 9/3242 |
| 2017/0208070 A1* | 7/2017 | Burns | G06Q 30/00 |
| 2018/0121921 A1* | 5/2018 | Woo | G06Q 20/206 |
| 2018/0145834 A1* | 5/2018 | Dharankar | H04L 63/0823 |
| 2018/0359641 A1* | 12/2018 | Idnani | H04W 60/00 |
| 2019/0191304 A1* | 6/2019 | Hatch | H04W 12/04071 |
| 2020/0213706 A1* | 7/2020 | Reily | G06F 3/167 |
| 2020/0359154 A1* | 11/2020 | Brown | H04R 29/00 |

\* cited by examiner

AUTOMATICALLY CONNECTING TO A SECURED NETWORK

TECHNICAL FIELD

This disclosure generally relates to wireless-enabled devices that are capable of connecting to a network.

BACKGROUND

Wireless-enabled devices can communicate with one another over one or more wireless networks. These devices may connect to a wireless network (e.g., an 802.11 Wi-Fi network) via an access point (AP) such as a wireless router. To connect a device to a new secure network, a user of the device may input authentication credentials (e.g., a password associated with the wireless network) to the device, which are then communicated by the device to the AP in order for the device to be authenticated to the secure network.

SUMMARY

In one aspect, this document features a method for facilitating automatic connection to a network. The method includes receiving, at a first device that is authenticated to the network, an identifier of a second device, and retrieving, by the first device based on the identifier, a public key for the second device. The data encrypted using the public key is decryptable using a private key of the second device. The method also includes encrypting, using the public key for the second device, credential information usable by the second device for authenticating to the network, and transmitting, to the second device, the encrypted credential information.

In another aspect, this document features a wireless-enabled device that includes memory, one or more processing devices, and a transceiver disposed in communication with the one or more processing devices. The one or more processing devices are configured to initiate retrieval of a public key for a second device, based on an identifier received from the second device, and encrypt, using the public key for the second device, credential information usable by the second device for authenticating to a network. At least a portion of the credential information is received from an access point of the network, and the data encrypted using the public key is decryptable using a private key of the second device. The transceiver is configured to receive the portion of the credential information from the access point, receive a signal including the public key of the second device, and transmit, to the second device, the encrypted credential information.

In another aspect, this document features one or more machine-readable storage devices having encoded thereon instructions for causing one or more processing devices to perform various operations. The operations include receiving an identifier of a second device, and retrieving, based on the identifier, a public key for the second device. The data encrypted using the public key is decryptable using a private key of the second device. The operations also include encrypting, using the public key for the second device, credential information usable by the second device for authenticating to the network, and initiating a transmission of the encrypted credential information.

Implementations of the above aspects can include one or more of the following features.

Retrieving the public key for the second device can include providing, to a remote computing device, the identifier of the second device, and receiving, in response to providing the identifier of the second device, the public key of the second device. Providing the identifier of the second device to the remote computing device can include sending a query, to the remote computing device, requesting the public key for the second device, and receiving results of the query retrieved by the remote computing system. The identifier can be included with a certificate and the public key. Retrieving the public key for the second device can include determining that the certificate is associated with the second device by verifying the digital signature, and retrieving the public key from the certificate responsive to determining that the certificate is associated with the second device. The identifier can include a digital signature. The identifier can be received as a portion of a beacon transmitted by the second device. The beacon can be transmitted in accordance with IEEE 802.11 wireless standards. A determination may be made that a signal strength associated with the beacon satisfies a threshold condition, and the public key may be retrieved in response to such a determination. The identifier can be a portion of a vendor specific information element in the beacon. The credential information can include at least one of: (i) credentials for connecting to the local network, (ii) configuration data for connecting to the local network, and (iii) credentials for signing into one or more online services. In some cases, a signature associated with the public key may be verified, wherein the signature indicates that the public key is authentic for the second device. The second device can include an acoustic transducer, and the credential information can include configuration information associated with adjusting an audio output of the acoustic transducer of the second device in accordance with an audio output of the first device.

In another aspect, this document features a method for automatically connecting to a network, wherein the method includes transmitting, by a device, an identifier associated with the device, and receiving, in response to the transmitting the identifier, encrypted credential information for accessing the network. The encrypted credential information is encrypted using a public key and is decryptable using a private key available to the device. The method also includes decrypting the encrypted credential information using the private key to retrieve credentials for accessing the network, and connecting to an access point of the network using the credentials.

In another aspect, this document features a wireless-enabled device that includes a transceiver, memory, and one or more processing devices disposed in communication with the transceiver. The transceiver is configured to transmit an identifier associated with the device, and receive, in response to the transmitting the identifier, encrypted credential information for accessing the network. The encrypted credential is encrypted using a public key of the device. The one or more processing devices are configured to retrieve a private key for the device, wherein the encrypted credential information is decryptable using the private key. The one or more processing devices are also configured to decrypt the encrypted credential information using the private key to retrieve credentials for accessing a wireless network, and initiating a connection to an access point of the network using the credentials.

In another aspect, this document features one or more machine-readable storage devices having encoded thereon instructions for causing one or more processing devices to perform various operations. The operations include causing transmission of an identifier associated with the device, and receiving, in response, encrypted credential information for accessing the network. The encrypted credential information is encrypted using a public key and decryptable using a private key available to the device. The operations also include decrypting the encrypted credential information using the private key to retrieve credentials for accessing the network, and initiating a connection to an access point of the network using the credentials.

Implementations of the above aspects can include one or more of the following features. The identifier can be associated with a digital signature indicative of an authenticity of the identifier. The identifier can be transmitted in accordance with IEEE 802.11 wireless standards. The credential information can include at least one of: (i) credentials for connecting to the local network, (ii) configuration data for connecting to the local network, and (iii) credentials for signing into one or more online services. The device can include an acoustic transducer, and the credential information can include configuration information associated with adjusting an audio output of the acoustic transducer of the device in accordance with an audio output of a second device connected to the network. The identifier can be included with a certificate and a public key. Transmitting the identifier can cause a second device connected to the network to retrieve the public key from a global network. The identifier can be transmitted automatically upon detecting that the device has powered on.

In some implementations, the technology described herein may provide one or more of the following advantages.

By facilitating connection to a wireless network and/or a cloud-based system automatically via an authenticated device, the technology potentially obviates the need to connect newer devices individually. This in turn may improve user-experience by saving the user the burden of manually setting up each new device acquired by the user. Connecting to a network based on a received-signal strength may reduce the chances of inadvertently connecting to an incorrect network (e.g., a neighbor's wireless network).

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

The technology described in this document allows a wireless-enabled device to join a secure wireless network substantially automatically as long as at least one other wireless-enabled device is already authenticated to the network. For example, when a user turns on a new wireless-enabled device for the first time, the new device needs to be setup to connect to an access point (AP) in order to be connected to a secure local area network (LAN) and/or the Internet. The technology described herein causes the new device, upon being switched on, to broadcast a signal that includes an identifier of the device. A second device that is already authenticated to the secure network receives the broadcast signal, and based on the identifier included therein, obtains a public key associated with the new device. The second device then encrypts the network credentials using the public key of the new device and transmits the encrypted credentials to the new device. The new device decrypts the encrypted credentials using a private key, and uses the credentials to authenticate itself with an AP associated with the secured network. The new device is therefore able to connect to the AP, and thereby to the secure network substantially automatically, without a user having to manually set up the device.

The advent of Internet-of-Things (IoT) has spawned various types of wireless-enabled devices that need to be connected to an AP in order to communicate with one another. Such wireless-enabled devices (which may also be referred to as connected devices) can exchange information with one another to implement various "smart" functionalities. For example, a connected thermostat may be remotely controlled from an application executing on a user's mobile device. In some cases, the thermostat can be configured to adjust itself based on geolocation information received from the phone, for example, to switch the thermostat on before a user returns home. Other examples of such smart wireless-enabled devices include garage door openers, door locks, lights, speakers, switches, alarm systems, baby monitors or other audio-visual monitoring equipment, refrigerators and other consumer electronic devices, door-bells, vehicles etc. New connected devices are being developed actively, and are expected to become more ubiquitous in the future. The technology described herein allows new devices to automatically connect to a secure network (e.g., an IEEE 802.11 Wi-Fi network in a user's home), thereby potentially saving the user the hassle of manually setting up these devices. In the context of IoT devices, where more and more connected devices are becoming available, this can potentially save a user significant amount of time, thereby improving the overall user-experience associated with ownership and usage of such connected devices.

Figure 1:
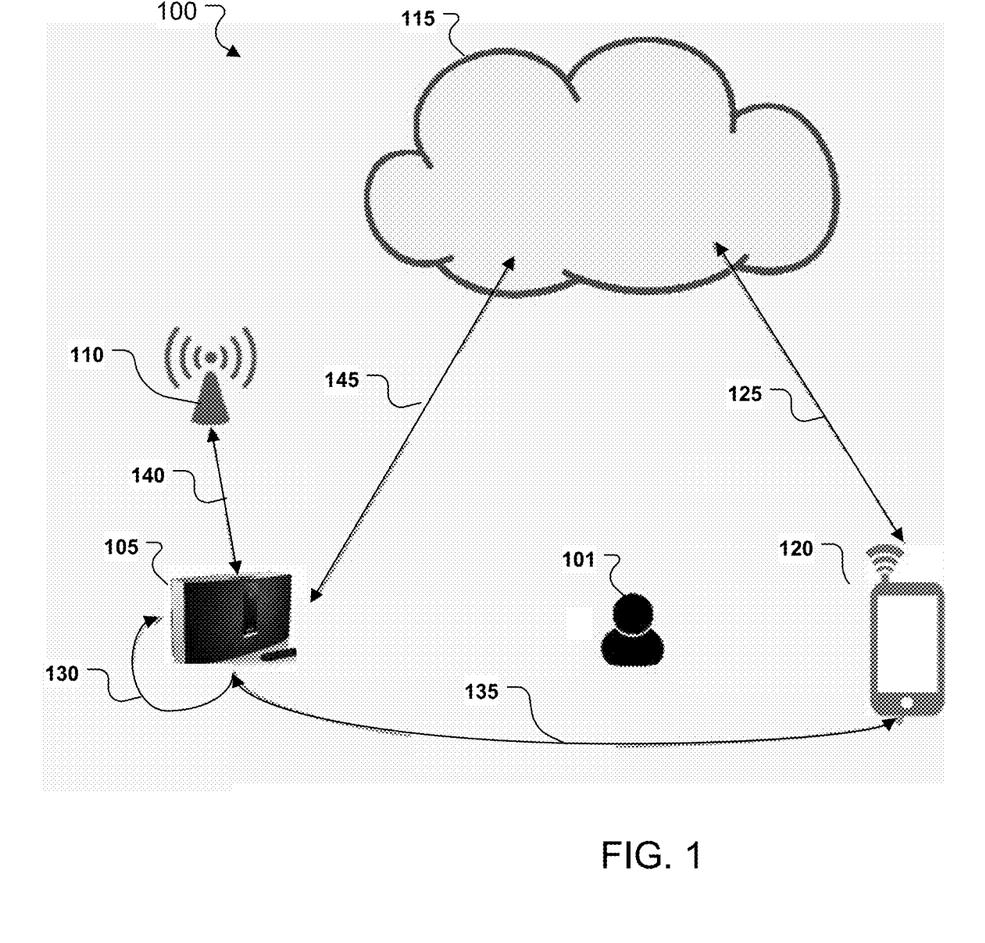
FIG. 1 is a schematic diagram illustrating an example of authenticating a wireless-enabled device to an access point and/or a cloud-based system.

FIG. 1 is a schematic diagram illustrating an example of an environment 100 in which a wireless-enabled device 105 is authenticated to an access point 110 and/or a cloud-based system 115. In this example, when a user 101 acquires a new connected device, the device 105 may need to be set-up first to connect to a wireless network in order to be fully functional. In some cases, this may be done, for example, by the user 101 providing the network access credentials (e.g., password associated with a Wi-Fi network) to the device 105 via a user interface presented on a display of the device 105. However, in some cases, the device 105 may not have a display and/or input/output device, and a secondary device may be used for presenting the user-interface and/or receiving user-input re the network access credentials. The secondary device can be a mobile device 120, which may need to be first authenticated itself (e.g., with the cloud-based system 115). For example, the mobile device 120 can be configured to execute an application, which exchanges information with the cloud-based system 115 over a link 125, and upon being authenticated to the cloud-based system 115, allows the mobile device 120 to communicate with the wireless-enabled device 105. In some cases, the cloud-based system 115 may be associated with the manufacturer or service provider related to the wireless-enabled device 105.

Once the user switches on the wireless-enabled device 105, the device 105 may not initially be connected to any network and/or AP. For example, when the device 105 is switched on for the first time, the device 105 may not have any pre-stored network information that would allow the device to connect to a network. In such cases, the device 105 may broadcast service set identifier (SSID) information of the network that the device is connected to, which in turn allows the mobile device 120 to discover the device 105 and be associated with the device 105. This may be referred to as an AP mode of the device 105, and in FIG. 1, the link 130 represents the broadcast of SSID information in the AP mode of the device 105. The SSID information broadcast by the device 105 may be received and displayed on a user-interface presented on the mobile device 120, allowing the user to make a selection to associate the device 105 with the application executing on the mobile device 120.

Once the device 105 is associated with the mobile device 120 and/or the application executing on the mobile device 120, the device 105 may transmit information on the APs that may be "visible" to the device 105. For example, if the device 105 receives broadcast information (e.g., a beacon) from the AP 110, the device 105 may transmit that information to the mobile device 120 over a link 135. The list of APs can then be displayed on a user-interface on the mobile device 120, allowing the user to select the AP to which the user would like to connect the device 105. For example, if the user would like to connect to the AP 110, the user may specify, through a user-interface presented on the mobile device 120, network access credentials (e.g., a password) that may be needed by the device 105 to connect to the AP 110. The credentials provided by the user is then transmitted by the mobile device 120 to the device 105 (for example, over the link 135), which in turn can be configured to use the credentials to establish the connection 140 between the device 105 and the AP 110. In some cases, information received from the mobile device 120 may be usable by the device 105 to establish the connection 145 between the device 105 and the cloud-based system 115.

The connection process described with reference to FIG. 1 can require the user 101 to intervene at various stages, for example, to provide the network credentials, select an AP etc. In some cases, the process can become burdensome for the user, for example, when the process needs to be repeated for every new device that the user acquires, and/or when a previously set up device is reset. Therefore, in such cases, it could be desirable to have a set-up process that is substantially automatic, and in which the user-intervention is insignificant or optional. This may be done, for example, by allowing a new device to acquire network access credentials from a device that was previously authenticated to the network. One example of such an authentication process is illustrated using FIGS. 2A and 2B. Specifically, FIG. 2A is a schematic diagram illustrating an example environment 200 in which a wireless-enabled device 205 is authenticated to an AP 110 and/or a cloud-based system 115 via a previously authenticated device 105, and FIG. 2B is a diagram illustrating communications between various entities of the environment depicted in FIG. 2A.

Figure 2A:
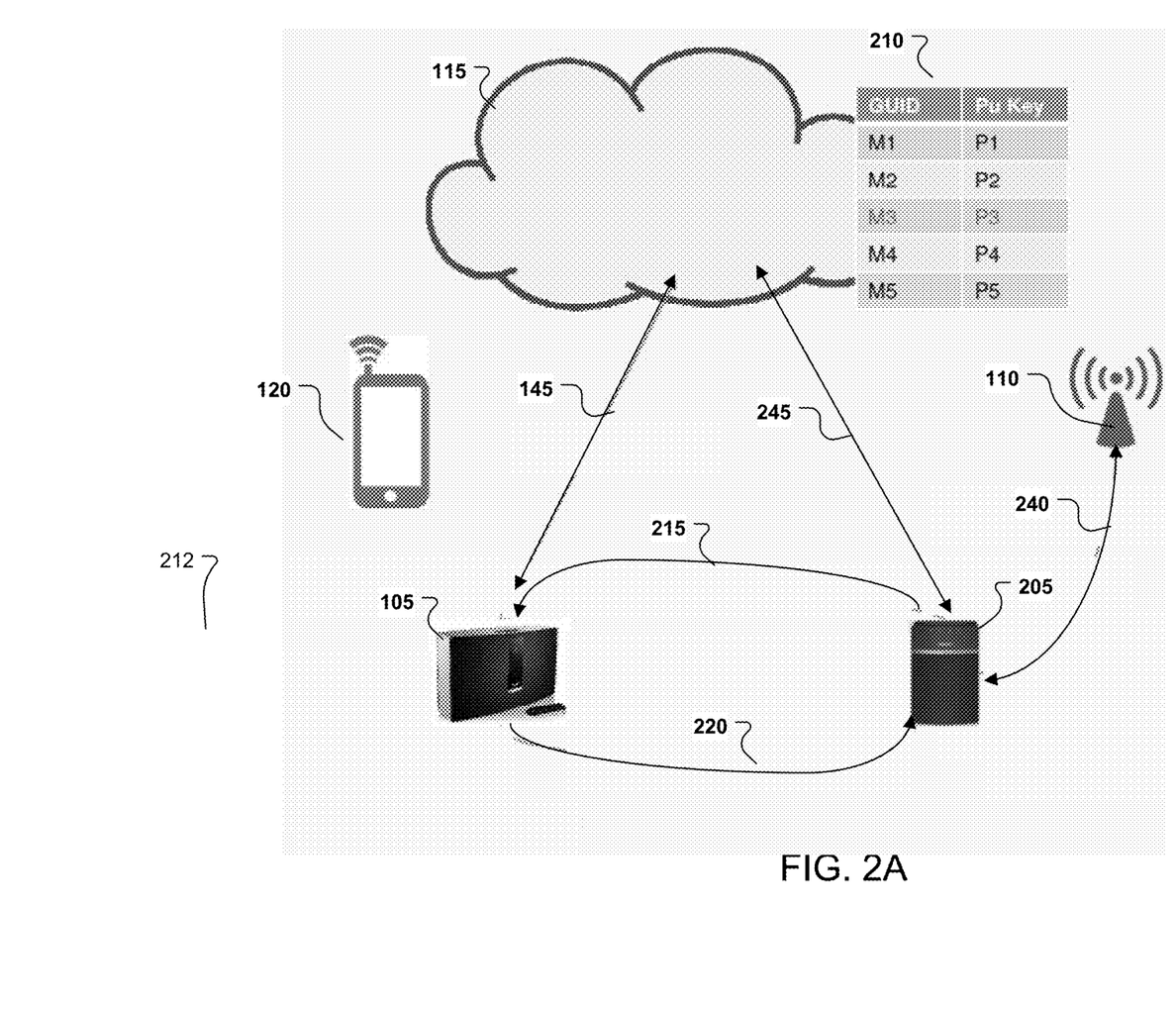
FIG. 2A is a schematic diagram illustrating an example of authenticating a wireless-enabled device to an access point and/or a cloud-based system via a previously authenticated device, in accordance with technology described herein.
Figure 2B:
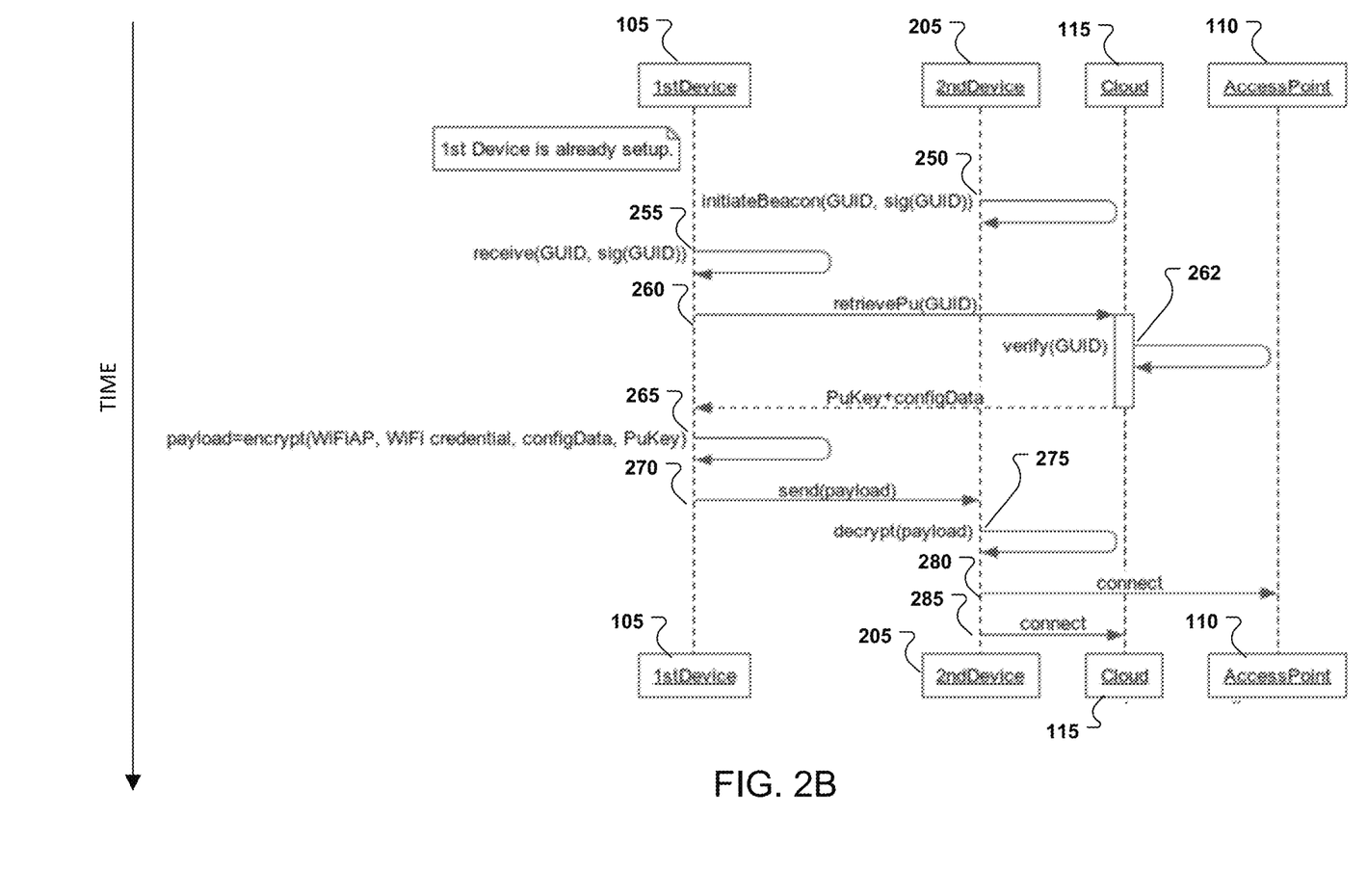
FIG. 2B is a diagram illustrating communications between various entities of the environment depicted in FIG. 2A.

In the example of FIG. 2A, the device 105 is already authenticated to the secure network. This can be done, for example, by establishing a connection to the AP 110 via a process as illustrated above with reference to FIG. 1. Once the device 105 is authenticated to the secure network, the device 105 has access to the network credentials needed to access the secure network, and the technology described herein allows any other device attempting to connect to the network to obtain the network credentials from the device 105. For example, the network credentials may be securely transmitted from one device to another after encryption using a public key of the receiving device, which in turn may retrieve the network credentials by decrypting the received information using a private key unique to the receiving device. The public-private key pairs can be pre-generated for each device, for example, at the time of manufacture. The private key of a device can be securely stored within the device itself such that other devices or entities cannot access the private key. In some implementations, the cloud-based system 115 can be configured to store corresponding public keys associated with multiple devices, and the authenticated device 105 can be configured to retrieve therefrom the public key of a device attempting to connect to the secure network. For example, the cloud-based system 115 can be associated with a particular company that stores corresponding public keys of devices manufactured by the company. In some implementations, the public keys of multiple devices may be stored in the form of a lookup table 210 that stores the public keys linked to corresponding globally unique identifier (GUIDs) associated with the multiple devices. When the device 105 is authenticated to such a cloud-based system 115, the device 105 may have access to the public key of any device manufactured by the company. For example, if the device 105 and the device 205 are products of the same company, the device 105 may retrieve the public key of the device 205 (or another device manufactured by the same company) by accessing the cloud-based system 115.

In the example of FIG. 2A, when the new device 205 is switched on for the first time, the device 205 is not authenticated to the AP 110 or the secure network. The device 205 can be configured to initiate a beacon transmission that includes an identifier associated with the device 205. In the timeline shown in FIG. 2B, this is represented as the transmission initiated by the device 205 at time point 250. In some implementations, the identifier can be the GUID associated with the device 205. In some implementations, the identifier may be a signature associated with the GUID, from which the GUID can be uniquely decoded. In some implementations, the identifier can be inserted into an editable field of an IEEE 802.11 beacon signal.

The beacon transmitted from the device 205 can be received by the device 105 over the link 215, as shown in FIG. 2A. In FIG. 2B, this is represented using the time point 255. In some implementations, responsive to receiving the beacon from the device 205, the device 105 identifies the GUID from the beacon and initiates retrieval of the corresponding public key from the cloud-based system 115. This may be done over the link 145 established between the device 105 and the cloud-based system 115, as shown in FIG. 2A. In FIG. 2B, the retrieval is initiated at time point 260. In this, the device 105 can provide the GUID of the device 205 to the cloud-based system and request the public key corresponding to the GUID.

Still referring to FIG. 2B, in response to initiating the retrieval at time point 260, the device 105 receives from the cloud-based system 115, the public key corresponding to the GUID of the device 205. In some implementations, the device 105 may also receive various configuration data usable by the device 205. Examples of configuration data include preset assignments, tokens for accessing account-based digital resources, and user-specific settings. In some implementations, the cloud-based system 115 may verify with the AP 110 that the GUID received from the first device indeed corresponds to a device that is authorized to connect to the AP 110. This communication is shown to be initiated at time point 262.

Upon receiving the public key of the device 205 from the cloud-based system 115, the device 105 encrypts the network access credentials using the public key, and transmits the encrypted information to the device 205. In FIG. 2B, the encryption initiation is represented using the time point 265, and the transmittal of the encrypted information (also referred to herein as payload) is represented using the time point 270. The payload can be sent, for example, over the link 220, as shown in FIG. 2A. Once the device 205 receives the encrypted payload, the payload can be decrypted using the corresponding private key available at the device 205. In FIG. 2B, this is represented using the time point 275. The network credentials thus become available to the device 205, which then uses the credentials to set up a connection 240 with the AP 110, as shown in FIG. 2A. In some implementations, the device 205 can use one or more configuration information included in the encrypted payload to set up a link 245 with the cloud-based system 115. In the timeline of FIG. 2B, the connection set up with the AP 110 and the connection set up with the cloud-based system 115 represented using the time points 280 and 285, respectively.

Figure 3A:
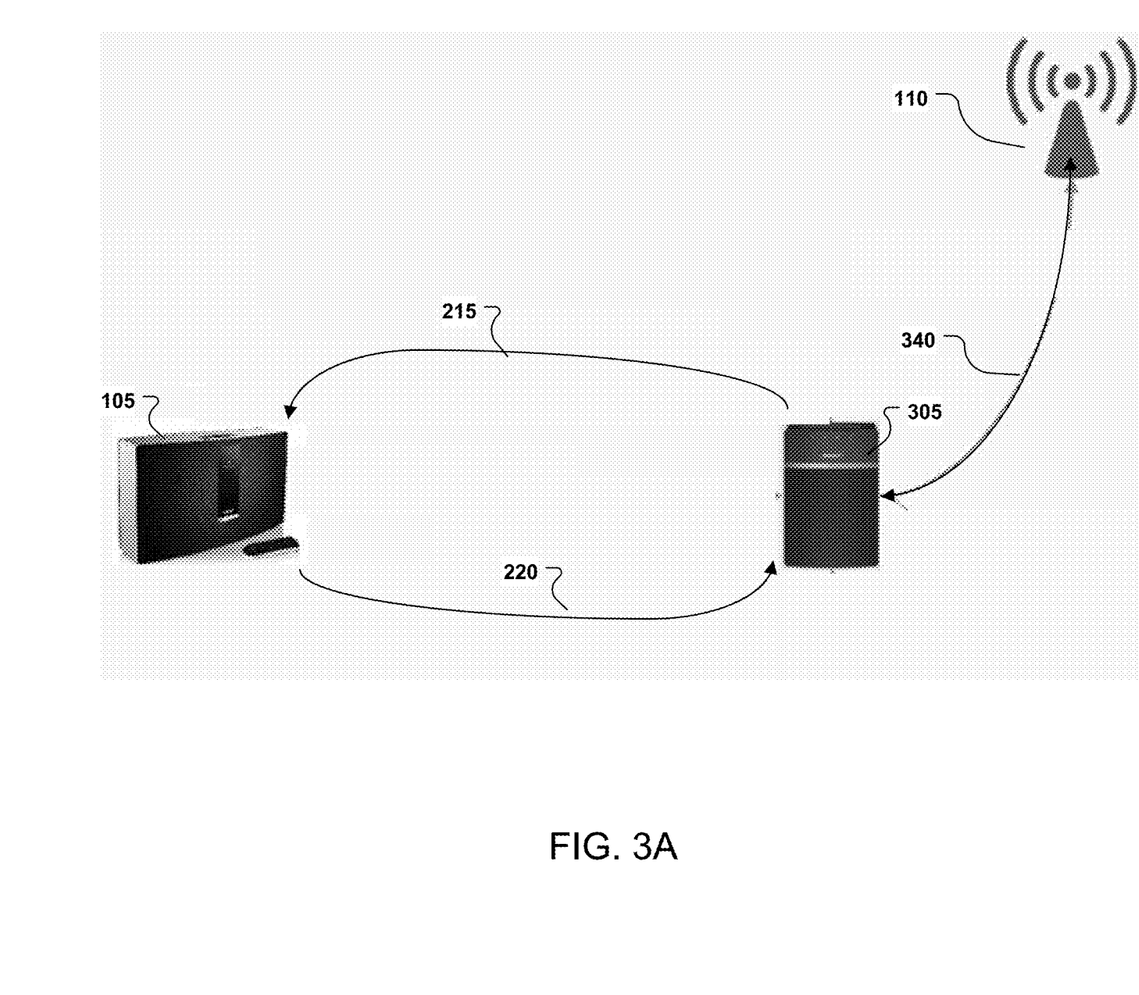
FIG. 3A is a schematic diagram illustrating another example of authenticating a wireless-enabled device to an access point via a previously authenticated device, in accordance with technology described herein.
Figure 3B:
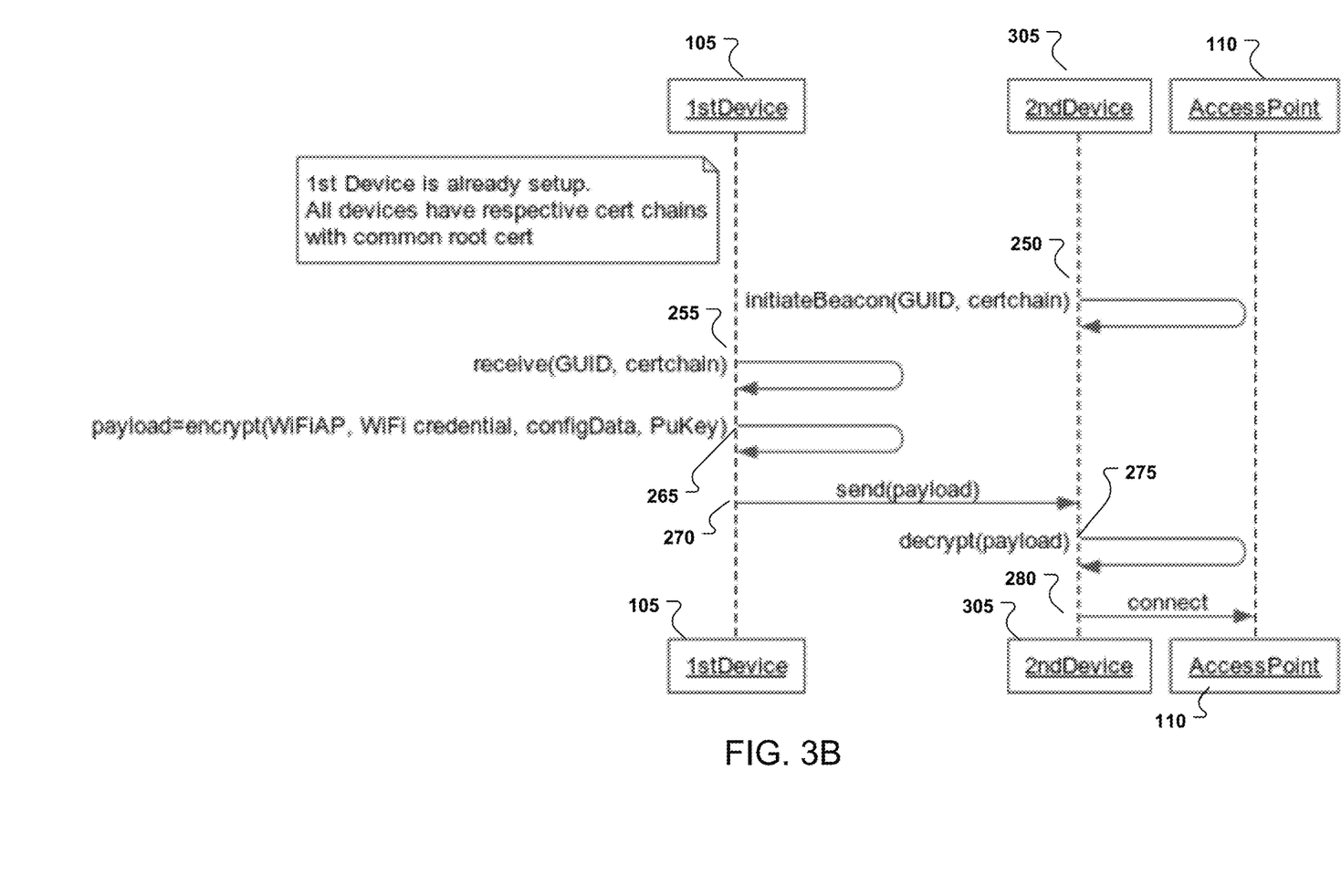
FIG. 3B is a diagram illustrating communications between various entities of the system depicted in FIG. 3A.

In some implementations, the public key of a device may not be available to the device 105. For example, if the new device attempting to connect to the secured network is from a different manufacturer, the device 105 may not have access to the public key of the new device through a shared cloud-based system 115. Such an example is illustrated in FIGS. 3A and 3B. Specifically, FIG. 3A is a schematic diagram illustrating another example of authenticating a wireless-enabled device to an access point via a previously authenticated device, and FIG. 3B is a diagram illustrating communications between various entities of the system depicted in FIG. 3A. In the example depicted in FIG. 3A, the device 305 does not share a cloud-based system that stores the public key of the device 305. Instead, the device 305 has access to information on a certificate chain with a common root certificate generated during manufacturing. In some implementations, the device 305 includes the certificate chain information along with a device identifier (e.g., GUID) and the public key into the beacon signal transmitted upon powering up. This can be transmitted over a link 215 (as shown in FIG. 3A) and initiated at the time point 250 (as shown in FIG. 3B). Once the device receives the beacon signal at time point 255, the device 105 retrieves the public key of the device 305 from the beacon using the certificate chain. Upon retrieving the public key from the beacon, the device 105 can be configured to encrypt the network access credentials and other configuration data, for example, and transmit the encrypted payload to the device 305. Referring to FIG. 3B, these operations are represented using the time points 265 and 270, respectively, and may be substantially identical to the corresponding operations described with reference to FIGS. 2A and 2B. Once the device 305 receives the encrypted payload, the payload can be decrypted using the corresponding private key available at the device 305. In FIG. 3B, this is represented using the time point 275. The network credentials thus become available to the device 305, which then uses the credentials to set up a connection 340 with the AP 110, as shown in FIG. 3A. In the timeline of FIG. 3B, the connection set up with the AP 110 is represented using the time point 280.

The process illustrated in the examples of FIGS. 2A-3B can therefore be used to automatically set up a connection between a new device (e.g., device 205 of FIG. 2A and/or device 305 of FIG. 3A) and the AP 110 substantially without any significant intervention from a user. For example, in some cases, the user may only need to turn on the device 205, which then automatically proceeds to establish the connection with the AP by communicating first with the device 105. Of course, if another connected device 105 is not available, the user may be prompted accordingly to proceed with a manual set up, as described, for example, with reference to FIG. 1. In some implementations, the when multiple APs are "visible" to the device 205, the user may be prompted to first manually select the AP to which the user intends to connect the device 205. In some implementations, the AP corresponding to the highest received-signal strength may be automatically selected as the AP to which the device 205 attempts to connect. In some implementations, the device 205 may receive an encrypted payload from multiple devices 105 each connected to a different AP. In such cases, the device 205 can be configured to select the network credentials in accordance with the AP selected either automatically based on signal strength or as indicated via a user-input. In some cases, the ability to select the AP can reduce the chances of a device inadvertently connecting to an incorrect AP such as an AP associated with a neighbor's network.

Figure 4:
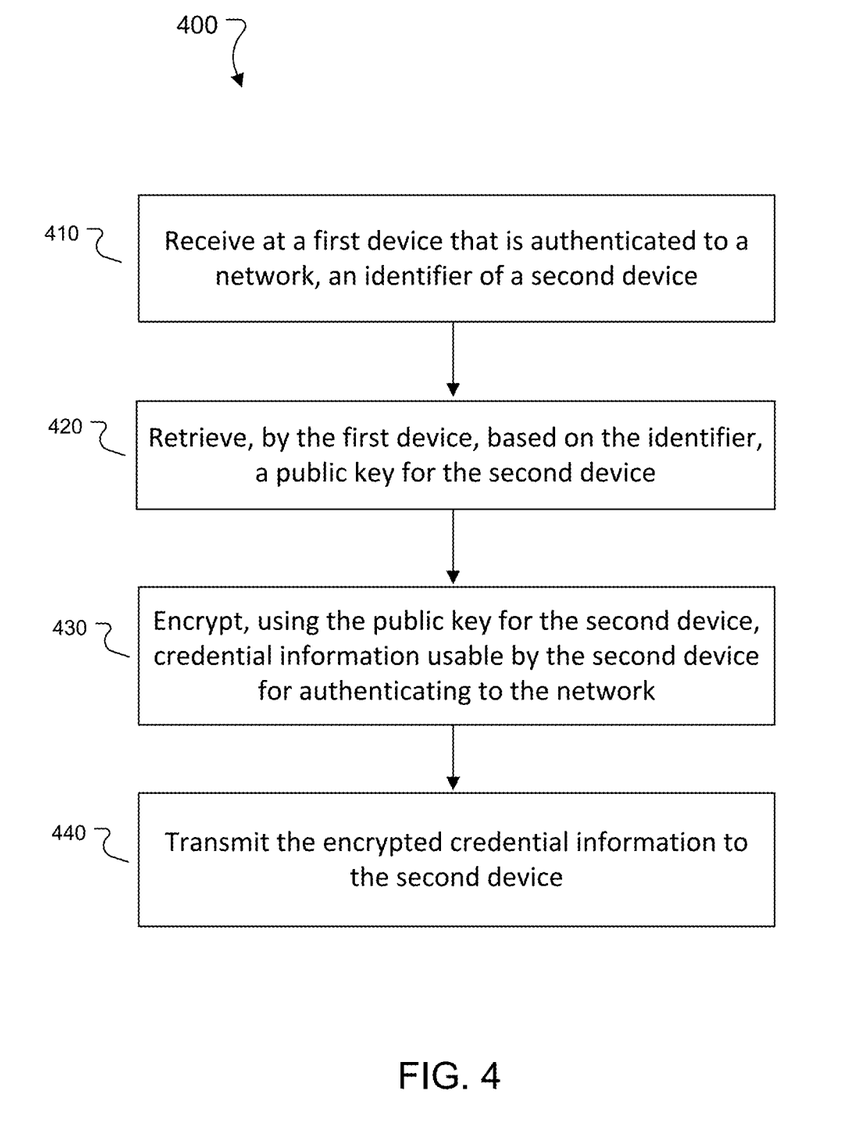
FIG. 4 is a flow chart of an example process for transmitting, from a first device that is already authenticated to a secure network to a second device, credential information usable by the second device to be authenticated to the network.

FIG. 4 is a flow chart of an example process 400 for transmitting, from a first device that is already authenticated to a secure network to a second device, credential information usable by the second device to be authenticated to the network. In some implementations, at least a portion of the process 400 can be executed by various components of the device 105 described above. For example, portions of the process 400 may be executed by one or more processing devices of the device 105 in cooperation with other components such as a transmission/receiver module of the wireless-enabled device 105.

Operations of the process 400 includes receiving, at a first device that is authenticated to a network, an identifier of a second device (410). In some implementations, the identifier is received as a portion of a beacon transmitted by the second device. The beacon can be transmitted, for example, in accordance with IEEE 802.11 wireless standards. For example, the identifier may be included in an editable, vendor-specific information element in the beacon signal. In some implementations, the second device can be substantially identical to the device 205 or the device 305, described above with reference to FIGS. 2A and 3A, respectively. In some implementations, one or both of the first device and the second device can include an acoustic transducer. In some implementations, one or both of the first device or the second device can be an IoT device.

Operations of the process 400 can also include retrieving, by the first device based on the identifier, a public key for the second device (420). The public key is such that data encrypted using the public key is decryptable using a private key of the second device. In some implementations, retrieving the public key for the second device can include providing, to a remote computing device, the identifier of the second device, and receiving, in response to providing the identifier of the second device, the public key of the second device. The remote computing device may be a part of a cloud-based system 115 as described above with reference to FIG. 2A. In some implementations, providing the identifier of the second device to the remote computing device can include sending a query, to the remote computing device, requesting the public key for the second device; and receiving results of the query retrieved by the remote computing system. For example, the public key of the second device may be stored as a look-up table (e.g., as described above with reference to FIG. 2A) within a database system, and the database may be queried based on the identifier of the second device to retrieve the public key. In some implementations, retrieving the public key for the second device includes retrieving the public key from the beacon signal received from the second device, as described with reference to FIGS. 3A and 3B.

Operations of the process 400 also includes encrypting, using the public key for the second device, credential information usable by the second device for authenticating to the network (430). The credential information can include, for example, at least one of: (i) credentials for connecting to the local network, and (ii) configuration data for connecting to the local network. In some implementations, the credential information can include credentials for signing into one or more online services.

Operations of the process further includes transmitting, to the second device, the encrypted credential information (440). The information transmitted to the second device may be decrypted by the second device to obtain the credential information usable by the second device to connect to the AP of the secured network.

Figure 5:
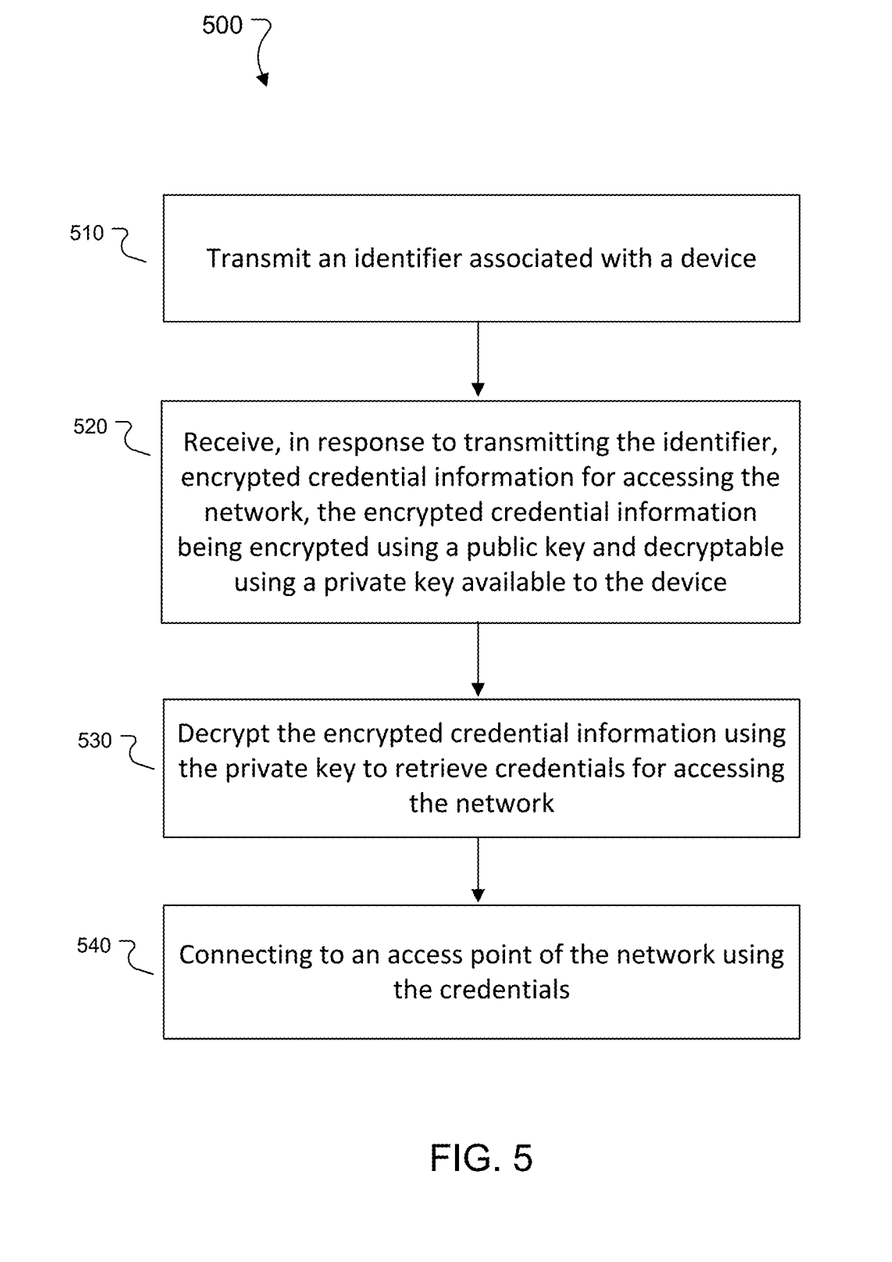
FIG. 5 is a flow chart of an example process for automatically connecting to an access point of a network using encrypted credentials received from a device already authenticated to the network.

FIG. 5 is a flow chart of an example process 500 for automatically connecting to an access point of a network using encrypted credentials received from a device already authenticated to the network. In some implementations, at least a portion of the process 500 can be executed by various components of the device 205 or the device 305 described above. For example, portions of the process 500 may be executed by one or more processing devices of the device 205 or 305 in cooperation with other components such as a transmission/receiver module of the corresponding device.

Operations of the process 500 includes transmitting, by a device, an identifier associated with the device (510). In some implementations, the identifier is associated with a digital signature indicative of an authenticity of the identifier. In some implementations, the identifier is transmitted in accordance with IEEE 802.11 wireless standards. In some implementations, the identifier is included with a certificate and the public key. In some implementations, transmitting the identifier causes a second device connected to the network to retrieve the public key from a cloud-based system such as the system 115 described above with reference to FIG. 2A. In some implementations, the identifier is transmitted automatically upon detecting that the device has powered on.

Operations of the process 500 also includes receiving, in response to the transmitting the identifier, encrypted credential information for accessing the network (520). The encrypted credential information is encrypted using a public key, and is decryptable using a private key available to the device. In some implementations, the credential information includes at least one of: (i) credentials for connecting to the local network, and (ii) configuration data for connecting to the local network.

Operations of the process 500 further includes decrypting the encrypted credential information using the private key to retrieve credentials for accessing the network (530), and connecting to an access point of the network using the credentials (540). The decryption of the credential information and connecting to the AP can happen substantially as described above with reference to FIG. 2A and FIG. 3A.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method for facilitating automatic connection to a network, the method comprising:

receiving, at a first device that is authenticated to the network, an identifier of a second device and a certificate, wherein the identifier and the certificate are transmitted to the first device by the second device, and wherein the certificate comprises a public key for the second device, the first device including a first acoustic transducer;

retrieving, by the first device, the public key for the second device, wherein data encrypted using the public key is decryptable using a private key of the second device;

encrypting, using the public key for the second device, credential information usable by the second device for authenticating to the network; and transmitting, to the second device, the encrypted credential information, wherein the second device comprises a second acoustic transducer and wherein the credential information comprises configuration information associated with adjusting an audio output of the second acoustic transducer in accordance with an audio output of the first acoustic transducer.

2. The method of claim 1, wherein retrieving the public key for the second device comprises:

determining that the certificate is associated with the second device by verifying a digital signature; and retrieving the public key from the certificate responsive to determining that the certificate is associated with the second device.

3. The method of claim 1, wherein the identifier includes a digital signature.

4. The method of claim 1, wherein the identifier is received as a portion of a beacon transmitted by the second device.

5. The method of claim 4, wherein the beacon is transmitted in accordance with IEEE 802.11 wireless standards.

6. The method of claim 4, further comprising determining a signal strength associated with the beacon satisfies a threshold condition; and retrieving the public key responsive to determining that the signal strength satisfies the threshold condition.

7. The method of claim 4, wherein the identifier is a portion of a vendor specific information element in the beacon.

8. The method of claim 1, wherein the credential information comprises at least one of: (i) credentials for connecting to the network, and (ii) configuration data for connecting to the network.

9. The method of claim 1, wherein the credential information comprises credentials for signing into one or more online services.

10. The method of claim 1, further comprising:

verifying a signature associated with the public key, the signature indicating that the public key is authentic for the second device.

11. A method for automatically connecting to a network, the method comprising:

transmitting, to a first device by a second device, an identifier associated with the second device and a certificate, wherein the certificate comprises a public key for the second device, wherein the first device is connected to the network;

receiving, in response to the transmitting the identifier, encrypted credential information for accessing the network, the encrypted credential information being encrypted using the public key and decryptable using a private key available to the second device;

decrypting the encrypted credential information using the private key to retrieve credentials for accessing the network, wherein the first device includes a first acoustic transducer, the second device comprises a second acoustic transducer, and wherein the credential information comprises configuration information associated with adjusting an audio output of the second acoustic transducer in accordance with an audio output of the first acoustic transducer; and connecting to an access point of the network using the credentials.

12. The method of claim 11, wherein the identifier is associated with a digital signature indicative of an authenticity of the identifier.

13. The method of claim 11, wherein the identifier is transmitted in accordance with IEEE 802.11 wireless standards.

14. The method of claim 11, wherein the credential information comprises at least one of: (i) credentials for connecting to the network, and (ii) configuration data for connecting to the network.

15. The method of claim 11, wherein the credential information comprises credentials for signing into one or more online services.

16. The method of claim 11, wherein transmitting the identifier and the certificate causes the first device to determine that the certificate is associated with the second device by verifying a digital signature, and retrieve the public key from the certificate responsive to determining that the certificate is associated with the second device, wherein the first device is connected to the network.

17. The method of claim 11, wherein the identifier is transmitted automatically upon detecting that the second device has powered on.

18. A wireless-enabled device comprising:

a first acoustic transducer;

memory; and one or more processing devices configured to:

initiate retrieval of a public key for a second device, based on an identifier and a certificate received from the second device, wherein the certificate comprises the public key, encrypt, using the public key for the second device, credential information usable by the second device for authenticating to a network, wherein at least a portion of the credential information is received from an access point of the network, and wherein data encrypted using the public key is decryptable using a private key of the second device; and a transceiver disposed in communication with the one or more processing devices, the transceiver configured to:

receive the portion of the credential information from the access point, receive a signal comprising the public key of the second device, and transmit, to the second device, the encrypted credential information, wherein the second device comprises a second acoustic transducer and wherein the credential information comprises configuration information associated with adjusting an audio output of the second acoustic transducer in accordance with an audio output of the first acoustic transducer.

19. The device of claim 18, wherein the one or more processing devices are further configured to:

determine that the certificate is associated with the second device by verifying a digital signature; and initiate the retrieval of the public key from the certificate responsive to determining that the certificate is associated with the second device.

20. The device of claim 18, wherein the transceiver is configured to receive a beacon transmitted from the second device in accordance with IEEE 802.11 wireless standards, and the one or more processing devices are configured to:
  determine that a signal strength associated with the beacon satisfies a threshold condition; and
  retrieve the public key responsive to determining that the signal strength satisfies the threshold condition.

21. The device of claim 20, wherein the one or more processing devices are configured to retrieve the identifier from a portion of a vendor specific information element in the beacon.

22. The device of claim 18, wherein the credential information comprises at least one of: (i) credentials for connecting to the network, and (ii) configuration data for connecting to the network.

23. The device of claim 18, wherein the credential information comprises credentials for signing into one or more online services.

24. The device of claim 18, wherein the one or more processing devices are configured to:
  verify a signature associated with the public key, the signature indicating that the public key is authentic for the second device.

25. A wireless-enabled device comprising:
a transceiver configured to:
  transmit, to a second device connected to a network, an identifier associated with the wireless-enabled device and a certificate, wherein the certificate comprises a public key for the wireless-enabled device,
  receive, in response to the transmitting the identifier, encrypted credential information for accessing the network, the encrypted credential being encrypted using the public key;
memory; and
one or more processing devices disposed in communication with the transceiver, the one or more processing devices configured to:
  retrieve a private key for the wireless-enabled device, wherein the encrypted credential information is decryptable using the private key,
  decrypt the encrypted credential information using the private key to retrieve credentials for accessing a wireless network, wherein the wireless-enabled device includes a first acoustic transducer and the second device includes a second acoustic transducer, and wherein the credential information comprises configuration information associated with adjusting an audio output of the first acoustic transducer in accordance with an audio output of the second acoustic transducer, and
  initiate a connection to an access point of the network using the credentials.

26. The device of claim 25, wherein the identifier is associated with a digital signature indicative of an authenticity of the identifier.

27. The device of claim 25, wherein the identifier is transmitted as a portion of a vendor-specific information element of a beacon transmitted in accordance with IEEE 802.11 wireless standards.

28. The device of claim 25, wherein the credential information comprises at least one of: (i) credentials for connecting to the network, and (ii) configuration data for connecting to the network.

29. The device of claim 25, wherein the credential information comprises credentials for signing into one or more online services.

30. The device of claim 25, wherein the one or more processing devices are further configured to:
  detect that the wireless-enabled device has powered on; and
  initiate a transmission of the identifier automatically responsive to detecting that the wireless-enabled device has powered on.

31. One or more machine-readable storage devices having encoded thereon instructions for causing one or more processing devices to perform operations comprising:
  receiving, at a first device from a second device, an identifier and a certificate of the second device, wherein the identifier and the certificate are transmitted by the second device and wherein the certificate comprises a public key for the second device, the first device being connected to a network and including a first acoustic transducer;
  retrieving the public key for the second device, wherein data encrypted using the public key is decryptable using a private key of the second device;
  encrypting, using the public key for the second device, credential information usable by the second device for authenticating to the network; and
  initiating a transmission of the encrypted credential information,
    wherein the second device includes a second acoustic transducer and wherein the credential information comprises configuration information associated with adjusting an audio output of the second acoustic transducer in accordance with an audio output of the first acoustic transducer.

32. One or more machine-readable storage devices having encoded thereon instructions for causing one or more processing devices to perform operations comprising:
  causing transmission to a first device, of an identifier associated with a second device and a certificate, wherein the certificate comprises a public key for the second device, the first device being connected to a network and including a first acoustic transducer;
  receiving, in response to transmitting the identifier, encrypted credential information for accessing the network, the encrypted credential information being encrypted using the public key and decryptable using a private key available to the second device;
  decrypting the encrypted credential information using the private key to retrieve credentials for accessing the network, wherein the second device includes a second acoustic transducer and wherein the credential information comprises configuration information associated with adjusting an audio output of the second acoustic transducer in accordance with an audio output of the first acoustic transducer; and
  initiating a connection to an access point of the network using the credentials.

* * * * *